(12) United States Patent
Sujan et al.

(10) Patent No.: US 8,639,436 B2
(45) Date of Patent: *Jan. 28, 2014

(54) SYSTEM AND METHOD OF VEHICLE FUEL QUANTITY MANAGEMENT

(75) Inventors: Vivek A. Sujan, Columbus, IN (US); Phani Vajapeyazula, Columbus, IN (US); Kenneth Follen, Greenwood, IN (US); An Wu, Columbus, IN (US); Barty L. Moffett, Seymour, IN (US); Howard R. Frost, Columbus, IN (US)

(73) Assignee: Cummins Intellectual Property, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/349,472

(22) Filed: Jan. 12, 2012

(65) Prior Publication Data

US 2012/0221234 A1  Aug. 30, 2012

Related U.S. Application Data

(60) Provisional application No. 61/432,026, filed on Jan. 12, 2011.

(51) Int. Cl.
*G06F 19/00* (2011.01)
(52) U.S. Cl.
USPC .......................... 701/123; 701/29.1; 701/32.5
(58) Field of Classification Search
USPC ........................................ 701/29.1, 32.5, 123
See application file for complete search history.

(56) References Cited

U.S. PATENT DOCUMENTS

| | | | |
|---|---|---|---|
| 4,368,509 A | 1/1983 | Li | |
| 5,231,897 A | 8/1993 | Morita | |
| 5,394,331 A | 2/1995 | Dudek et al. | |
| 5,598,335 A | 1/1997 | You | |
| 5,913,917 A * | 6/1999 | Murphy | 701/123 |
| 6,038,505 A | 3/2000 | Probst et al. | |
| 6,154,658 A | 11/2000 | Caci | |
| 6,237,500 B1 * | 5/2001 | Lund | 104/88.01 |
| 6,356,831 B1 | 3/2002 | Michelini et al. | |
| 6,374,173 B1 | 4/2002 | Ehlbeck | |
| 6,631,322 B1 * | 10/2003 | Arthur et al. | 701/454 |
| 7,742,867 B2 | 6/2010 | Liu et al. | |
| 2003/0160455 A1 | 8/2003 | Hu et al. | |
| 2004/0239488 A1 | 12/2004 | Douglass, Jr. et al. | |
| 2005/0090940 A1 | 4/2005 | Pajakowski et al. | |
| 2005/0274553 A1 | 12/2005 | Salman et al. | |
| 2006/0119507 A1 | 6/2006 | Cawse | |

(Continued)

OTHER PUBLICATIONS

U.S. Appl. No. 61/364,010, filed Jul. 13, 2010.*

(Continued)

*Primary Examiner* — Calvin Cheung
(74) *Attorney, Agent, or Firm* — Foley & Lardner LLP (57) ABSTRACT

Systems and methods of vehicle fuel quantity management are provided to assist in determining an optimal quantity of fuel to carry on-board a vehicle. Certain routes are sufficiently short so to not require a completely filled fuel tank to traverse. Additionally, most routes have an abundance of vehicle fueling stations that provide ample refueling opportunities, thus permitting an operator to carry less fuel than might be required to complete a route. Exemplary embodiments of the present disclosure balance initial fuel loading and fuel stops to optimize the amount of freight weight that can be carried for a given route. The benefit is increased freight efficiency in transporting cargo from source to destination while maintaining drivability.

23 Claims, 4 Drawing Sheets

(56) References Cited

U.S. PATENT DOCUMENTS

| | | | |
|---|---|---|---|
| 2006/0185626 A1 | 8/2006 | Allen et al. | |
| 2007/0106442 A1 | 5/2007 | Lu | |
| 2007/0112475 A1 | 5/2007 | Koebler et al. | |
| 2008/0027639 A1 | 1/2008 | Tryon | |
| 2008/0059036 A1 | 3/2008 | Imai et al. | |
| 2008/0125958 A1* | 5/2008 | Boss et al. | 701/123 |
| 2008/0133120 A1* | 6/2008 | Romanick | 701/123 |
| 2008/0208393 A1 | 8/2008 | Schricker | |
| 2008/0249667 A1 | 10/2008 | Horvitz | |
| 2008/0254937 A1 | 10/2008 | Makiyama | |
| 2008/0262712 A1 | 10/2008 | Duty et al. | |
| 2009/0082957 A1 | 3/2009 | Agassi et al. | |
| 2009/0276267 A1 | 11/2009 | Padan | |
| 2010/0010732 A1 | 1/2010 | Hartman | |
| 2010/0023190 A1 | 1/2010 | Kumar et al. | |
| 2010/0049397 A1* | 2/2010 | Liu et al. | 701/33 |
| 2010/0198508 A1* | 8/2010 | Tang | 701/210 |
| 2010/0228404 A1 | 9/2010 | Link, II et al. | |
| 2010/0287073 A1 | 11/2010 | Kocis et al. | |
| 2010/0318273 A1 | 12/2010 | Aleksic et al. | |
| 2012/0016576 A1* | 1/2012 | Huang et al. | 701/200 |
| 2012/0143449 A1* | 6/2012 | Chauncey et al. | 701/51 |
| 2012/0239587 A1* | 9/2012 | Dickman | 705/332 |

OTHER PUBLICATIONS

U.S. Appl. No. 61/420,556, filed Dec. 7, 2010.*

The International Search Report and the Written Opinion of the International Search Authority dated Apr. 30, 2012; International Application No. PCT/US2012/021126.

* cited by examiner

SYSTEM AND METHOD OF VEHICLE FUEL QUANTITY MANAGEMENT

CROSS-REFERENCE TO RELATED APPLICATION

This application claims the benefit of U.S. Provisional Application No. 61/432,026, filed Jan. 12, 2011, which is hereby incorporated by reference in its entirety.

TECHNICAL FIELD

This disclosure relates to vehicle fuel management. More particularly, this disclosure relates to managing vehicle fuel load to optimize freight weight.

BACKGROUND

Vehicle operators generally prefer to load the maximum quantity of fuel that their vehicle tanks will hold prior to undertaking a journey. Most operators adopt this behavior because they prefer not to expend time and effort at refueling along route. Further, operators seek to minimize risk associated with uncertainty, such as unanticipated traffic and weather conditions. One way to minimize the exposure to such risks is to maximize the quantity of fuel carried.

Generally, vehicle operators are paid on a time to delivery basis. Thus, most operators are motivated to traverse their routes as rapidly as possible. As a vehicle traverses a given route, fuel economy can be significantly influenced by the way an operator selects the vehicle speed. An aggressive operator that creates rapid transitions in speed while maintaining the maximum allowable speed limit through the route (legal, fleet owner imposed, etc.), will likely not achieve maximum fuel economy. Such a driver will prefer to maximize fuel load in order to accommodate their driving pattern.

SUMMARY

According to some embodiments of the present disclosure, a method is provided for vehicle fuel quantity management. The method includes accessing first operator input data indicative of at least one first operator input, said at least one first operator input including at least one of fuel cost, trip time, route beginning and ending points to define a route, and maximum vehicle speed. The method further includes accessing predetermined vehicle parameter data indicative of at least one predetermined vehicle parameter, the at least one predetermined vehicle parameter including at least one of vehicle mass, vehicle drag, vehicle rolling resistance, tire circumference, front area of vehicle, powertrain torque loss, vehicle tank capacity, and engine friction. The method also includes accessing road terrain data indicative of at least one road terrain element, the at least one road terrain element including at least one of speed limit changes, off ramp locations, fueling locations, road grade, air density, position, elevation, and traffic congestion. The method additionally includes performing a first fuel assessment to determine a preliminary route fuel quantity based on said predetermined vehicle parameter data, said road terrain data, and the first operator input data. And the method includes determining a first fuel quantity to optimize freight weight based on the first fuel assessment; accessing current vehicle operating condition data and current road terrain data indicative of at least current vehicle speed, current road grade, and current fueling locations; performing a second fuel assessment to determine at least one recommended fueling stop location and at least one recommended fuel amount, and generating electronic recommendation signals corresponding to said determined fueling stop and fuel amount and communicating said recommendation signals to a receiver.

According to other embodiments of the present disclosure, a system adapted for vehicle fuel quantity management is provided. The system includes an operator input module containing data indicative of at least one operator input, the at least one operator input including at least one of fuel cost, trip time, route beginning and ending points to define a route, and maximum vehicle speed. The system further includes a vehicle parameter module containing data indicative of at least one predetermined vehicle parameter, the at least one predetermined vehicle parameter including at least one of vehicle mass, vehicle drag, vehicle rolling resistance, tire circumference, front area of vehicle, powertrain torque loss, vehicle tank capacity, and engine friction. The system also includes a road terrain element module containing data indicative of at least one road terrain element, the at least one road terrain element including at least one of speed limit changes, off ramp locations, fueling locations, road grade, air density, position, elevation, and traffic congestion. The system additionally includes a vehicle operating condition module containing data indicative of at least current vehicle speed. And the system includes a vehicle fuel quantity management module adapted to perform a first fuel assessment to determine a preliminary route fuel quantity based on the predetermined vehicle parameter data, the road terrain data, and the first operator input data; determine a first fuel quantity to optimize freight weight based on said first fuel assessment and operator input data; and perform a second fuel assessment to determine at least one recommended fueling stop location and at least one recommended fuel amount.

Additional embodiments of the present disclosure provide a system and method for vehicle fuel quantity management to be implemented in computer programmable software and stored in computer readable media.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and/or other exemplary features and advantages of the preferred embodiments of the present disclosure will become more apparent through the detailed description of exemplary embodiments thereof with reference to the accompanying drawings, in which.

Throughout the drawings, like reference numbers and labels should be understood to refer to like elements, features, and structures.

DETAILED DESCRIPTION

Exemplary embodiments of the present disclosure will now be described more fully with reference to the accompanying drawings. The matters exemplified in this description are provided to assist in a comprehensive understanding of various embodiments disclosed with reference to the accompanying figures. Accordingly, those of ordinary skill in the art will recognize that various changes and modifications of the embodiments described herein can be made without departing from the scope and spirit of the claimed inventions. Descriptions of well-known functions and constructions are omitted for clarity and conciseness. To aid in clarity of description, the terms "upper," "lower," "above," "below," "left" and "right," as used herein, provide reference with respect to orientation of the accompanying drawings and are not intended to be limiting.

Given a desired route and vehicle fuel economy, amongst other variables, the present disclosure is directed to a system and method for determining the optimal quantity of fuel to carry on-board a vehicle in order to optimize the amount of freight that can be loaded on the truck. Traditionally, it is common practice for fleet owners and drivers to load fuel to the full capacity of the vehicle fuel tank or tanks. Because of the weight of the fuel and vehicle weight limitations, this maximization of the onboard or carry-on fuel places a limitation on the total amount of freight that the vehicle can carry. And if the route being driven is short enough, or permits intermediate refueling events (such as at rest stops), then filling the tank to full capacity may result in significantly more fuel being carried than the amount actually required. This results in an overall decrease in freight efficiency. For example, in certain trucks having a baseline freight weight of 33,080 lbs, for every 331 lbs of additional freight a vehicle can carry, there is a 1% freight efficiency improvement. At a fuel density of 7.2 lbs/gallon, 331 lbs of freight is equivalent to approximately 46 gallons of fuel. Thus, for every 46 gallons of fuel reduced or avoided from carrying onboard the truck during the trip, a 1% freight efficiency improvement can be realized. Accordingly, exemplary embodiments of the systems and methods of the present disclosure are directed to manage fuel quantity to determine the optimal fuel quantity and loading balance for a given route. One benefit of optimizing fuel management is increased freight efficiency in transporting cargo from source to destination.

To assist in the determination of appropriate operating condition references, applicants introduce a Cycle Efficiency Management (CEM) module that employs control processes to furnish an operator with anticipated and currently desired vehicle operational behavior to optimize fuel economy. The CEM control processes focus on powertrain components such as engine, transmission, accessories, final drive, wheels and vehicle. The processes interface with the operator to provide guidance as to appropriate vehicle speed/power targets and transmission gear selection targets. The CEM module is useful in conditioning an operator to optimize behavior based on certain performance criteria.

Figure 1:
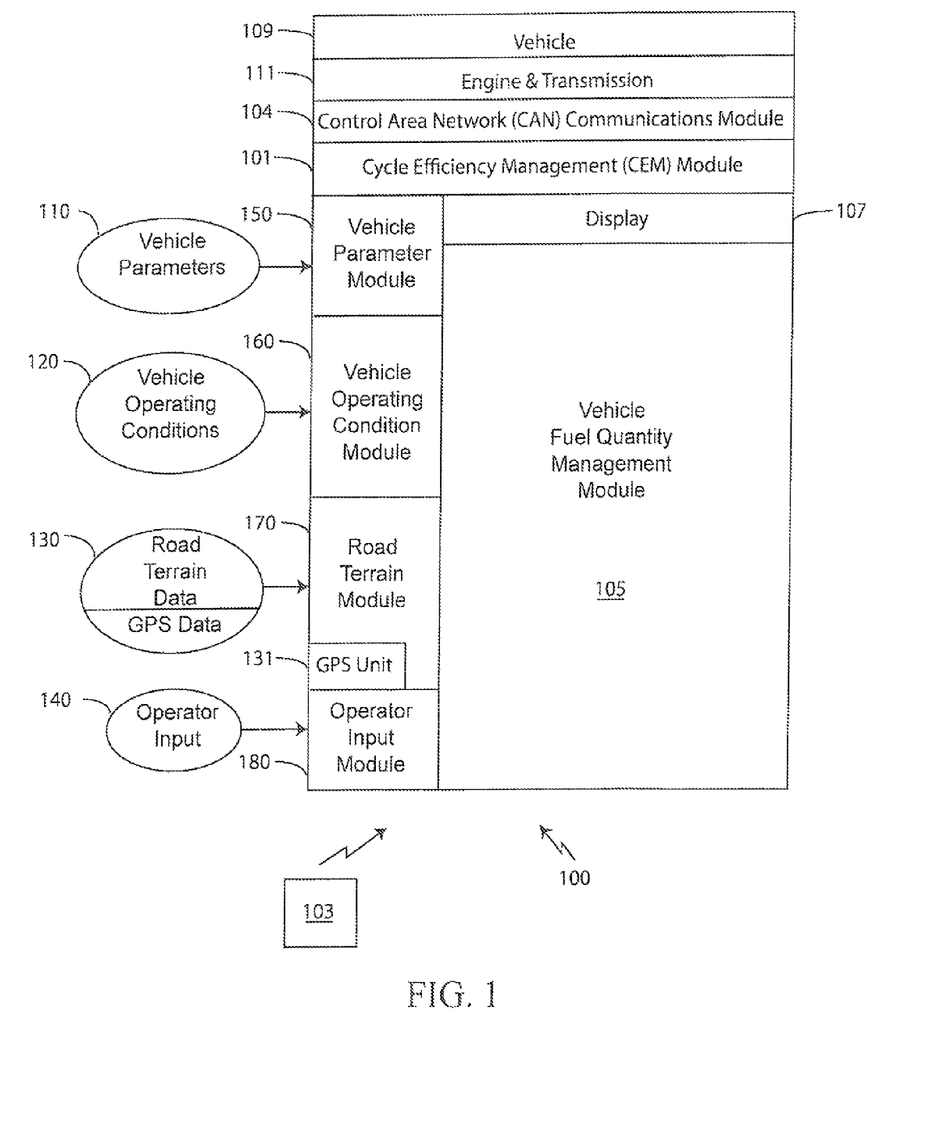
FIG. 1 is a system diagram for a vehicle fuel quantity management system in accordance with an exemplary embodiment of the present disclosure.
Figure 2:
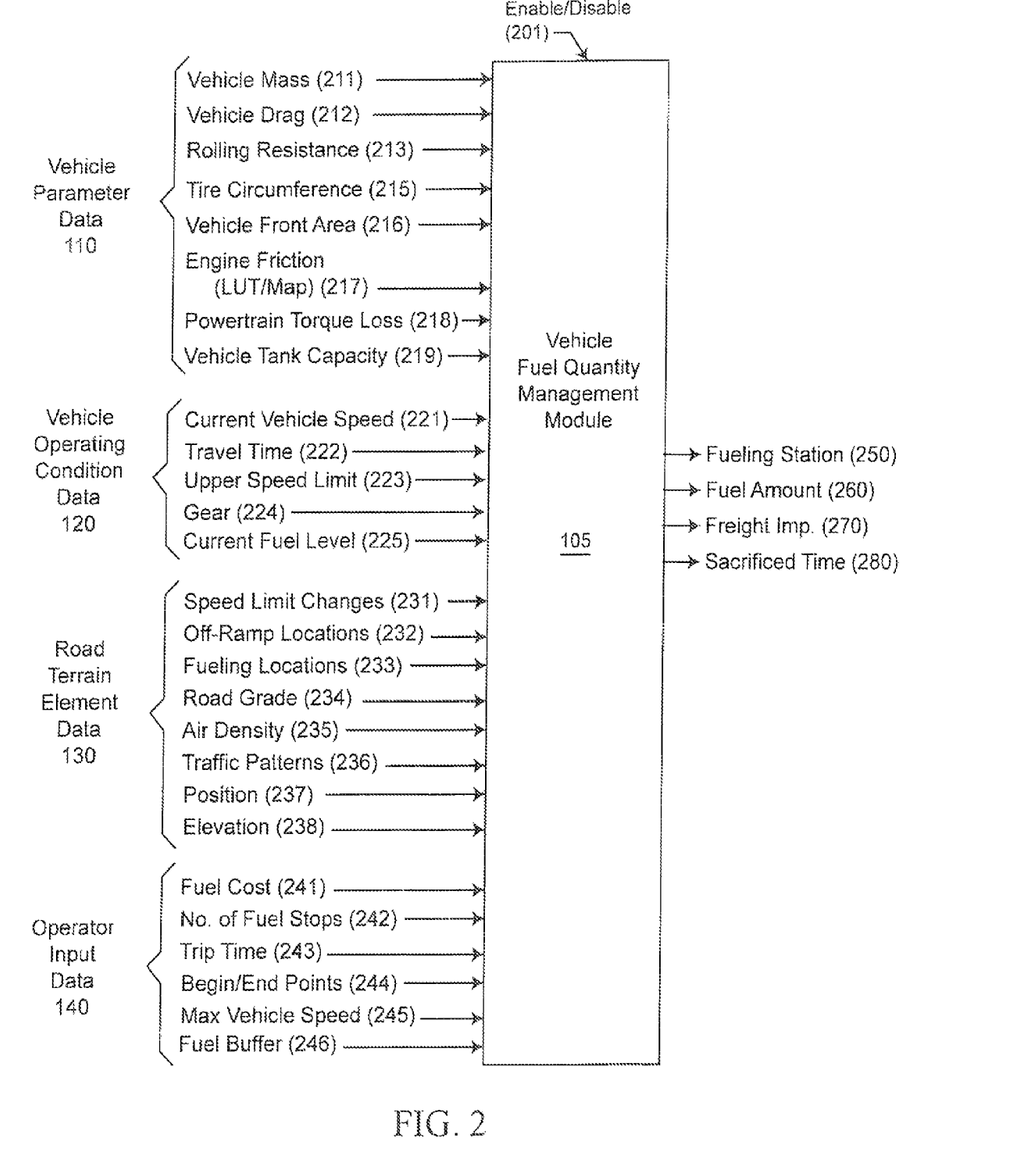
FIG. 2 is an input/output flow diagram for a vehicle fuel quantity management module in accordance with an exemplary embodiment.

FIG. 1 is a system diagram for a vehicle fuel quantity management system 100 in accordance with an exemplary embodiment of the systems and methods of the present disclosure. System 100 is integrated into a vehicle 109, such as a truck or automobile, having an engine and transmission 111 including a plurality of gears into which the transmission can be shifted automatically by a transmission control unit or manually by a driver of the vehicle. Generally, predetermined vehicle parameters 110, current vehicle operating conditions 120, terrain profile data/information 130, and operator input 140 are input into a CEM module 101 via control area network (CAN) communications module 104. These inputs are used by a vehicle fuel quantity management module 105 to determine a recommended fueling stop location and fuel amount, the fueling stop location being geographical/GPS coordinates. In addition to other components, CEM module 101 contains the vehicle fuel quantity management module 105, and may also include a central processor and database. Communication equipment/modules 104 can be provided to enable input data, such as road terrain data, to be transmitted to the central processor for monitoring and control. CEM module 101 may include a vehicle parameter module 150 adapted to receive vehicle parameters 110, a vehicle operating condition module 160 adapted to receive current vehicle operating conditions 120, a road terrain module 170 adapted to receive road terrain data 130, and an operator input module 180 to receive operator input 140. Exemplary embodiments provide for at least a portion of the road terrain data to be provided as GPS data to a GPS unit 131, which can supply data in advance of an operation or forthcoming positions or in real-time as the vehicle is operated and route traversed. As used herein, "real-time" should be understood to mean as fast as equipment or sensors can provide. Thus, if a sensor can output data at, for example, a 500 millisecond resolution, then "real time," in this context, should be understood to mean time within a 500 millisecond resolution. Alternate embodiments provide for road terrain data to be maintained in computer storage 103 and downloaded to the CEM module 101 prior to the start of a trip or transmitted wirelessly over-the-air at any time, for example, by using cellular technology. The CEM module 101 enables operator input 140 in order to provide a degree of control for vehicle operators and thus improve driveability. In operation, the operator programs one or more preferences for how they desire the vehicle to behave during the course of the route. As shown in FIG. 2, using this control mode, the operator can, amongst other things, specify such preferences as fuel cost 241, number of fuel stops to make while traversing the route 242, travel time desired to traverse the route 223, route beginning and ending points 244, maximum vehicle speed 245, and desired fuel buffer 246. Exemplary embodiments provide for the operator to specify preferences via display 107 that is adapted to, amongst other things, indicate the current fuel level to a vehicle operator. Exemplary embodiments provide that one or more of modules 150, 160, 170, and 180 may be separate from CEM module 101.

FIG. 2 is an input/output flow diagram for a vehicle fuel quantity management module 105 in accordance with an exemplary embodiment of the systems and methods of the present disclosure. FIG. 2 illustrates system inputs to vehicle fuel quantity management module 105, which processes the inputs to determine, amongst other things, a recommended fueling station location 250, to optimize onboard fuel quantity along and throughout the route to thereby optimize the amount of loaded freight or capacity for loading freight. System inputs are received by CEM module 101, which then enables vehicle fuel quantity management module 105 via an enable/disable signal 201. The enable/disable signal 201 provides for disabling the vehicle fuel quantity management system in response to an operator-initiated event. Data indicative of at least one vehicle parameter 110 is received as an input to vehicle fuel quantity management module 105 via CEM module 101, for example, input to the vehicle parameter module 150. The vehicle parameter data 110 includes data signifying or representing, for example, vehicle mass 211, vehicle drag (or air drag coefficient) 212, vehicle rolling resistance 213, tire circumference 215, vehicle front area 216, engine friction 217, powertrain torque loss 218, vehicle tank capacity 219, and driveline ratio and/or axle loading (not shown), which in exemplary embodiments provide three values corresponding to loading on the steer tire, drive tire and trailer tires. The driveline ratio comprises a secondary gearing used in mechanically coupling the transmission to the wheels and is available in certain but not all vehicles. When a driveline ratio is available then the ratio is considered by the vehicle fuel quantity management module 105 in determining fueling recommendations. Vehicle parameter data 110 may include actual values of each of these parameters, such as a vehicle mass value, a drag value, and/or a rolling resistance value. Data indicative of at least one current vehicle operating condition 120 is also received as an input to the vehicle fuel quantity management module 105 via CEM module 101, for example, input to the vehicle operating condition module 160. The operating condition data 120 includes data signifying or representing current vehicle speed 221, travel or trip time 222, upper speed limit 223, gear 224, and current fuel level 225. The upper speed limit (Vmax) is a limit some vehicle owners place on their vehicle's and may be less than the maximum speed legally allowable for a particular route. Exemplary embodiments assume that vehicle operators drive at or near the upper speed limit. Exemplary embodiments provide for vehicle operating condition data to be acquired via a vehicle monitoring and positional system, such as a GPS unit 131, and/or provided by the operator. Exemplary embodiments provide for operating condition and route terrain data to be dynamically acquired in real-time, or in spans of "foresight" or look-ahead windows of a discrete distance, such as, for example, 2 miles. In acquiring operating condition and route terrain data in discrete segments as the vehicle moves through a unit distance interval, informational data is acquired and the system updated to, amongst other things, correct for deviations from planned trip traversal, such as route deviations, changes in vehicle speed, changes in traffic patterns, etc. The look-ahead window can be set at a predetermined default interval and/or can be adjustable by the operator. Window size is selected based upon desired data resolution and speed of processing. Data indicative of at least one road terrain element 130 is also received as an input to the vehicle fuel quantity management module 105 via CEM module 101, for example, to the road terrain module 170. The road terrain element data 130 includes data signifying or representing speed limit changes 231, off-ramp locations 232, fueling station locations 233, road grade 234, air density 235, traffic patterns or congestion 236, position 237 and elevation 238. Exemplary embodiments provide for speed limit and road terrain data to be furnished by an Advanced Driver Assistance System (ADAS), such as that furnished by data vendors, such as, for example, E-Horizon™ and NAVTEQ Traffic™ systems; positional-based systems, such as a GPS, can provide data on vehicle position 237. Road terrain element data 130, such as route grade 234, elevation 238, speed limit changes 231 and fueling station locations 233 can be obtained ahead of time to provide a snapshot of the entire route, and then refined in real-time as the route is traversed. Data indicative of at least one operator input 140 is also received as an input to the vehicle fuel quantity management module 105 via CEM module 101, for example, to the operator input module 180. The operator input data 140 includes data signifying or representing fuel cost 241, number of fueling stops 242, trip time 243, route beginning and ending points 244, maximum vehicle speed 245, which is a speed the operator prefers not to exceed and may be less than the legal speed limit, and desired fuel buffer 246. Exemplary embodiments call for maximum vehicle speed 245 to be the same as upper speed limit 223. Vehicle fuel quantity management module 105 processes the various parameters, conditions, data, and inputs, and generates outputs as described in more detail hereinbelow. Outputs from vehicle fuel quantity management module 105 include fueling station location 250, fuel amount 260, freight efficiency improvement 270, and sacrificed time 280, which is the amount of time required for the fueling stops taken over the course of the route. Exemplary embodiments provide for fueling station location data to be furnished by an Advanced Driver Assistance System (ADAS), such as that furnished by data vendors, such as, for example, E-Horizon™ and NAVTEQ Traffic™ systems; positional-based systems, such as a GPS, can provide data on vehicle position 237. Exemplary embodiments provide for fueling station location to be graphically depicted on a visual display, such as a location identified on a display map. Exemplary embodiments provide for generating electronic recommendation signals corresponding to a recommended fueling stop location and recommended fuel amount and communicating the recommendation signals to a receiver, wherein a receiver can be a display, computer, server, or electronic device.

Figure 3:
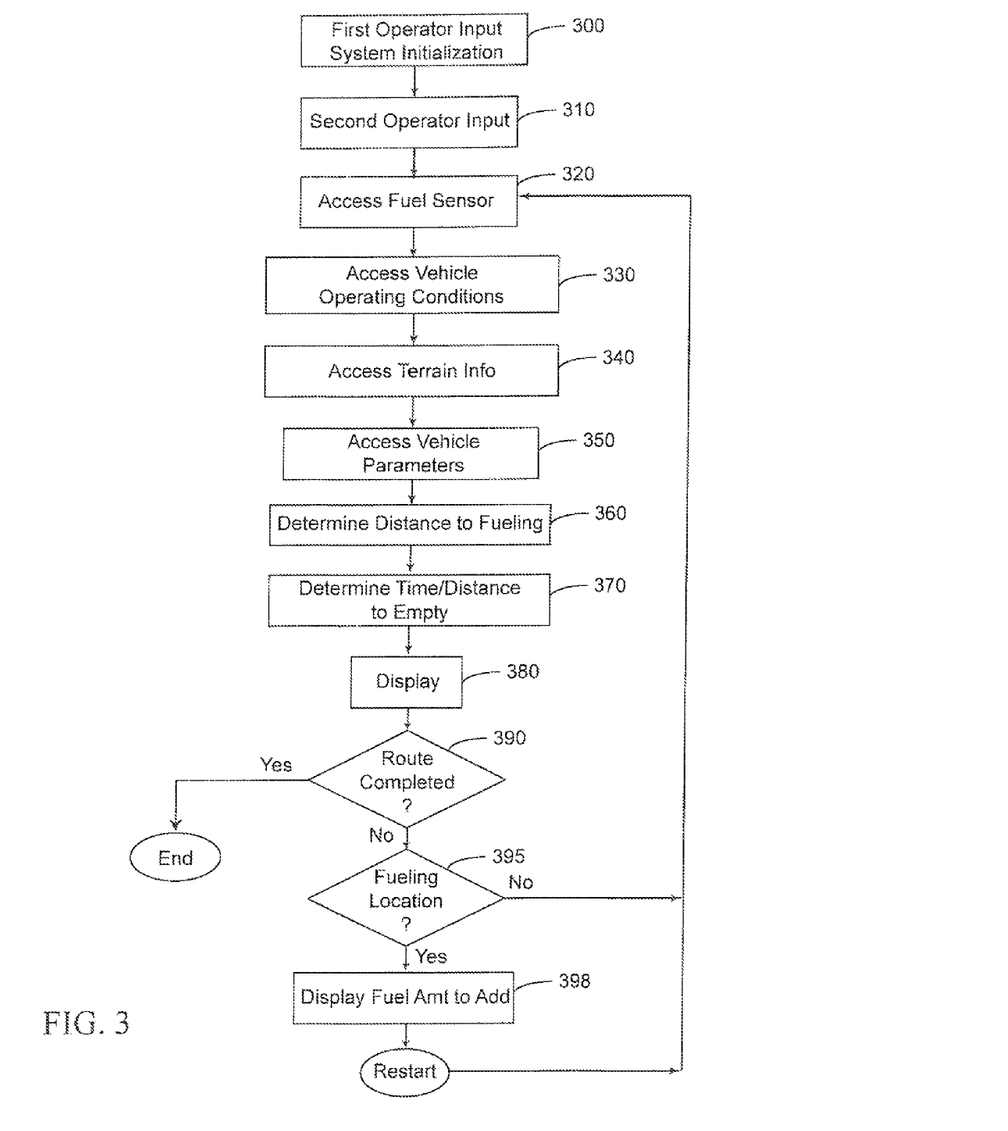
FIG. 3 is a flow diagram depicting method steps for vehicle fuel quantity management in accordance with an exemplary embodiment.

FIG. 3 is a flow diagram depicting the steps of a method for vehicle fuel quantity management in accordance with exemplary embodiments of the present disclosure. The method includes two steps: first, an offline, i.e., a first coarse evaluation or initialization and fuel assessment is performed over the full drive cycle/route to provide a determination of preliminary fuel needs for the overall route based on initial data, conditions, inputs and parameters, and a first fuel quantity in which to fill the vehicle that optimizes freight weight; second, during drive cycle execution, fine-tuned refinements to the fuel needs and fueling station location are periodically achieved using a moving look-ahead window during an online, that is, a second fuel assessment to provide a determination of subsequent fuel needs. Prior to deployment, the vehicle's fuel quantity management module 105 accesses first operator input data 300 comprising at least one of fuel cost (for example, cost per gallon), trip time (for example, time in minutes or hours to traverse the entire route), route beginning and ending points that establish route coordinates and which define the route, and maximum vehicle speed. The module 105 then performs the first coarse evaluation or initialization with known route and vehicle data by accessing predetermined vehicle parameter data and road terrain element data to determine route grade and speed profile vectors for the defined route. Exemplary embodiments provide for the route grade and speed profile vectors to be determined by the road terrain module 170. The route grade and speed profile vectors comprise the spectrum of route grade and speed limits over the course of the route so that grade and speed limits are identified for the entire route. The vectors are determined by accessing data pertaining to road grade and speed limit over the entire route from the ADAS and/or GPS unit and populating data structures with grade and speed limit data for the entire route. With this data, anticipated power demand can be determined over the entire route, which can then be translated into anticipated fuel consumption using the engine fuel map, as described in more detail hereinbelow. Thus, the amount of fuel required to traverse the entire route is ascertained. In exemplary embodiments, one of many formulations of power, as would be known to those of ordinary skill in the art, can be expressed as a function of vehicle velocity (v), air density ($\rho$), vehicle drag (or air drag coefficient) ($C_d$), vehicle front area (A), rolling resistance ($C_{rr}$), vehicle mass (m), gravitational acceleration (g), and road grade (g), provided by Equation I:

$$\text{Power} = \left\{ \frac{1}{2} \rho C_d A v^2 + C_{rr} m g \cos(\theta) + m g \sin(\theta) \right\} v \quad \text{Equation I}$$

Figure 4:
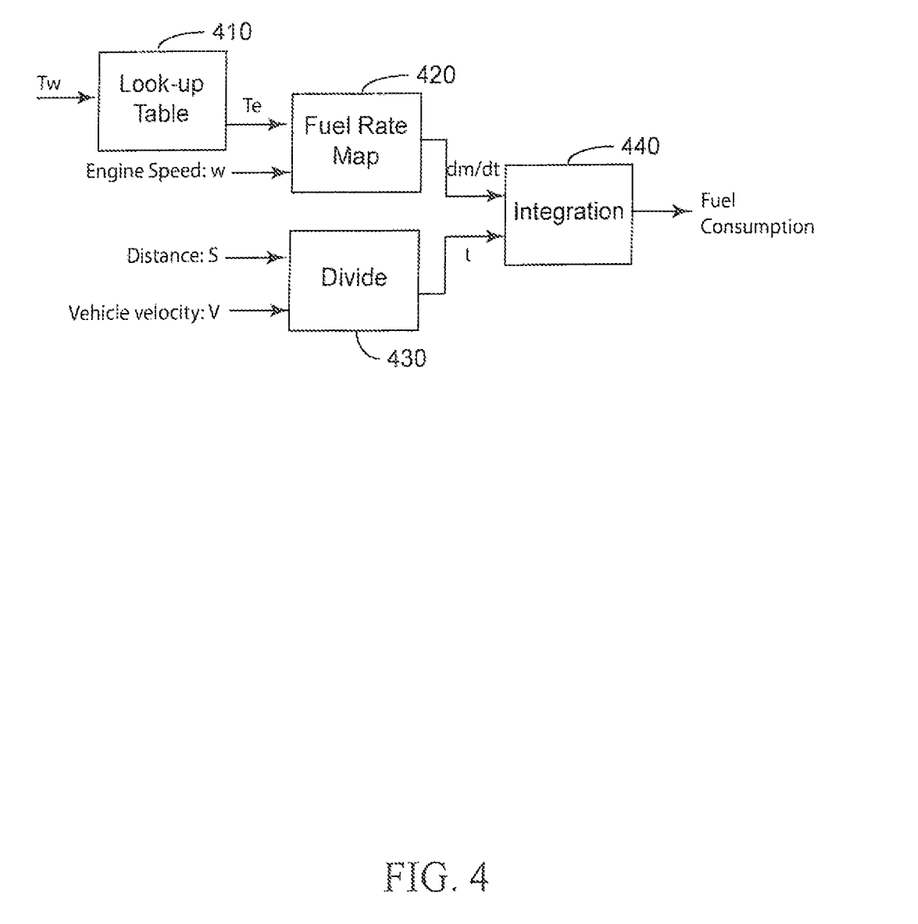
FIG. 4 is a flow diagram depicting an exemplary embodiment of a subsystem process of vehicle fuel quantity management in accordance with an exemplary embodiment.

FIG. 4 is a flow diagram depicting an exemplary embodiment of a subsystem process of vehicle fuel quantity management in accordance with an exemplary embodiment of the present disclosure. Torque on the vehicle's wheel is a function of force on the wheel and wheel radius, as expressed by $T_w = F_w \times R_w$, where force can be expressed by power, shown by Equation I, divided by vehicle velocity (v). With the torque on the vehicle's wheel known, a look-up table 410 can be accessed yielding torque loss in relation to gear ratio to provide engine torque ($T_e$). Engine torque ($T_e$) coupled with engine speed ($\omega$) can then be used to access an engine fuel map look-up table 420 to yield fuel flow rate $$\left( \frac{dm}{dt} \right).$$

Distance vectors (s) can be obtained from GPS unit 131, which when divided 430 by vehicle velocity (v) yields time (t) spent on that distance. Fuel rate $$\left( \frac{dm}{dt} \right)$$

can be integrated 440 through time (t) to determine fuel consumption over the distance. This analysis can be performed for all segments of the route to determine fuel needed to traverse the entire route.

Once the amount of fuel anticipated to traverse the entire route is known, that is, the preliminary route fuel quantity, second operator input data comprising at least one of the number of fuel stops and desired fuel buffer may be accessed, step 310. To facilitate selection of the number of fuel stops, module 105 displays, i.e., using display 107, a plot of freight capacity verses number of fueling stops, which shows how freight capacity or freight efficiency improvement increases as the number of fueling stops increases. The operator then selects, for example, by using a touch screen function on display 107, the number of fueling stops acceptable to yield a desired increase in freight capacity. This increase in freight capacity represents a freight efficiency improvement over the freight weight that the operator could have carried under a full fuel load.

Exemplary embodiments provide for the operator to identify a fuel buffer. Most operators are reluctant to permit their vehicle fuel levels to fall below a certain minimum and the fuel buffer represents the minimum amount of fuel that an operator is willing to accept. Further, some uncertainty exists in sensor measurements, GPS and ADAS data, with variance associated with equipment accuracy and tolerance, which can be identified through manufacturer specification sheets and reports. Also, uncertainty exists as to the route since traffic patterns, road closures, construction, etc., all introduce accuracy variances. To account for these and other uncertainties, Exemplary embodiments provide for determining an additional fuel quantity based on the operator fuel buffer and sensor and route uncertainties, with the additional fuel quantity being incorporated into the fuel amount ultimately recommended. Given the first fuel assessment and operator fuel buffer, module 105 then determines a first fuel quantity and recommended freight weight such that the first fuel quantity optimizes freight weight based on the first fuel assessment and the second operator input data. Additionally, module 105 identifies and recommends one or more fuel station locations.

Exemplary embodiments provide for the vehicle fuel quantity management system 100 to be initialized prior to the operator's entry into the vehicle, or initiated by an action of the operator, such as, for example, pressing a button on a user interface to start the assessment. A user interface may be provided in the vehicle and/or at a remote location in wireless communication with the vehicle. An operator, or an external source such as a central database, supplies the vehicle with a trip destination and planned route and trip time, and known road terrain element data 130 are acquired via the operator, a database, or data vendor, as described above. Exemplary embodiments provide for the operator to enter vehicle parameters 110 and preferences for how the vehicle should behave on the route. Alternatively, or in conjunction with operator entry, vehicle parameters can be provided by a database containing vehicle information. Further, road terrain element data 130, such as route grade 234, speed limit changes 231 and fueling station locations 233 can be obtained ahead of time to provide an offline snapshot of the entire route. The data is then processed in a first, offline assessment to provide an estimate of fuel needs, along with a vehicle speed profile vector comprising route velocities and a route grade vector comprising route grade profiles. Generally, the offline initialization of the systems and methods of the present disclosure is performed prior to or at the beginning of a trip. Alternatively, or additionally, offline initialization can occur at any point along the route after the vehicle is underway. Such a capability is convenient if it is desirable to undertake a delayed initialization or system recalibration or restart/re-initialization. Exemplary embodiments may employ a weighting function in determining optimal speed to account for vehicle momentum during downhill and uphill sections of the route. Inputs to the vehicle fuel quantity management system 100 may be received by an input signal processing module (not shown), which processes the data to a form useable by vehicle fuel quantity management module 105. For example, the input signal possessing module can translate data into different units, filter noise, truncate vectors, etc.

The offline assessment employs a representation of the vehicle, which in exemplary embodiments uses standard vehicle modeling known to those of ordinary skill in the art. One implementation employs a model wherein fuel consumption over a given route is described through differential-algebraic relationships that are a function of, amongst other things, vehicle velocity, that is, speed, and acceleration, gear, route grade, vehicle powertrain and engine parameters, such as described above. Exemplary embodiments provide for a vehicle model to identify a vehicle speed as a function of location on the route and road grade in order to assess fuel consumption and costs. In addition to fuel and fuel costs, cost can include vehicle warranty, maintenance, wear-and-tear, etc. Thus, exemplary embodiments may encompass any combination or all these cost components and provide the operator with an assessment of fuel relative to the combination or all costs. Exemplary embodiments assess fuel consumption relative to vehicle speed and gear state by accessing an engine map as discussed below.

Power demanded by a vehicle is a function, primarily, of the vehicle operating condition, which, among other things, includes vehicle mass, vehicle speed, rolling resistance and transmission gear, coupled with the instantaneous road conditions (road grade, elevation, drag, wind speed, air density, etc.). For example, if either the speed or grade drops/decreases by traveling at a lower speed or going downhill, less power will be required for the vehicle to traverse a given distance. Accounting for system inefficiencies, power can be translated into engine torque and the vehicle's system of gears translates vehicle speed to engine speed, as would be known to those of ordinary skill in the art. Exemplary embodiments provide for engine fuel data to be supplied by an engine fuel map look-up table (LUT) 217, 420 containing engine fuel data obtained, for example, from engine performance measurements under various speed/torque and grade combinations versus fuel consumed. The engine fuel map LUT is calibrated offline and embodies the relationship between engine torque, engine speed, grade and engine fueling. Knowing the vehicle's power train system, such as the driveline ratio, gear ratio, driveline system losses, etc., engine speed and torque can be converted to vehicle speed and transmission gear at a certain grade. Thus, an engine fuel map LUT can be obtained from an engine friction map LUT. Alternatively, a vehicle speed and grade based map can be obtained by driving the given vehicle at fixed speeds on constant grades, such as provided either in a controlled facility like a chassis dyno test cell, or by simulating the grade on a flat grade road using a programmable tow-dyno trailer. Separate engine fuel data is available for conditions when engine braking is enabled or when engine braking is disabled. Thus, by knowing power demand, vehicle speed, and transmission gear, which when coupled with engine speed and torque, a particular point on the engine map can be identified.

A change in engine speed location on the engine map will require a change in engine torque to achieve the same output power. And for a given point on the engine map, a certain amount of fuel will be required. Thus, by changing the engine speed and torque point, the amount of fuel needed to provide the same output power varies. By recognizing or determining the desired location on the engine map that minimizes fuel for a given power requirement, an equivalent vehicle speed choice can be back-calculated. Accordingly, an assessment of fuel consumption can be realized by traversing the engine map to find the appropriate engine speed and torque combination to satisfy the power demand and fuel consumption.

During travel, pre-planned routes are subject to operator change as road conditions, weather, traffic, and other unexpected situations arise that necessitate route deviation. Such deviations cause error in the offline assessment that was executed during system initialization, step 300 (or elsewhere). Deviations that impact vehicle speed, such as traffic patterns, are limiting conditions that are operationally akin to a speed limit constraint. To account for off-nominal deviations and other conditions that occur in real-time, the vehicle fuel quantity management module 105 employs an online, fine assessment process, an exemplary embodiment of which is as follows. As the vehicle is underway, route information is obtained via a vehicle monitoring and positional system, such as a GPS unit 131, and/or provided by the operator. Such route information confirms data obtained previously according to the planned route during offline assessment (step 300) and provides a basis for correction during unplanned route deviations as the route is driven. Exemplary embodiments provide for speed limit and road terrain data to be furnished by data vendors, such as, for example, E-Horizon™ and NAVTEQ Traffic™ systems, as described above.

As the route is traversed, the vehicle fuel quantity management system 100 checks for data within the limit of the look-ahead window, which is defined by a discrete distance. At each occurrence of a look-ahead window, the online assessment is performed. As discussed above, exemplary embodiments provide for operating conditions data and route terrain data to be dynamically acquired in real-time through the "foresight" or look-ahead windows of a discrete distance, such as, for example, 2 miles. In acquiring operating conditions data and route terrain data in discrete segments as the vehicle moves through a unit distance, informational data is acquired and the system updated to, amongst other things, correct for deviations from the offline assessment. The size or distance of the look-ahead window can be set at a default interval or adjustable by the operator. Window size is selected based upon the desired data resolution and speed of processing. Exemplary embodiments provide for data acquisition during the offline assessment to run at a coarse distance resolution, for example, 0.5 miles, whereas data acquisition during the online assessment runs at a fine resolution, for example, 0.1 miles, within its defined look-ahead window.

During an online assessment "look-ahead" window, data indicative of current fuel level is obtained from the vehicle fuel sensor, step 320. The vehicle fuel sensor provides data indicative of fuel level to the CEM module 101 and is available to module 105 via network 104. This data is adapted for display to the operator and communicated in real-time via display 107 as a tank level value or a fuel quantity value, i.e. gallons. Also during the online assessment "look-ahead" window, data indicative of the current vehicle operating condition is accessed, step 330. Current vehicle operating conditions include, in addition to travel time, the current vehicle speed, the lower speed target, the upper speed limit and current transmission gear. Exemplary embodiments provide for current vehicle speed to be obtained from instrumentation on the vehicle, such as, for example, a speedometer and/or a positional indicator, such as a GPS unit 131, which provides a measure of change relative to position over time. Data indicative of road terrain elements is accessed, step 340. Road terrain elements include, but are not limited to, speed limit changes, off ramp locations, fueling locations, road grade, air density, vehicle position or location (geographical/GPS coordinates), elevation, and traffic congestion. Data indicative of predetermined vehicle parameters is also accessed, step 350. Predetermined vehicle parameters include, but are not limited to, vehicle mass, vehicle drag, vehicle rolling resistance, tire circumference, front area of vehicle, powertrain torque loss, vehicle tank capacity, and engine friction. Data indicative of road terrain elements, predetermined vehicle parameters, and operator input are obtained primarily during system initialization, step 300, but can be updated or changed at any time by the operator or via network communication, such as wireless over-the-air transmissions, and during online assessment. Data is continually furnished by system 100 components and accessed as needed, as described above.

Outputs of the vehicle fuel quantity management module 105 include fueling station location 250, fuel amount 260, freight efficiency improvement 270, and sacrificed time 280, which is the amount of time required for the fueling stops taken over the course of the route. Exemplary embodiments provide for one or more of these outputs to be communicated to the vehicle operator via display 107 to inform and facilitate action by the operator. Display 107 can be a touch-screen interface for convenient data entry and is adapted to, amongst other things, indicate vehicle operating conditions. Exemplary embodiments provide for recommendations to be made to the operator concerning specific fueling stop locations along the route.

During online assessment, module 105 performs a second fuel assessment using the refined data available within the look-ahead window. The second fuel assessment includes an identification of station locations with finer resolution than available during the system initialization. Thus, module 105 can determine the distance to fueling stations relative to the vehicle's current position, step 360, with accuracy. Module 105 also determines a measure of remaining fuel in the vehicle's tank, which can be expressed in terms of time to empty, distance to travel before empty, step 370, as well as fuel remaining. Exemplary embodiments provide for measures of remaining fuel and fuel station location to be communicated to display 107 and presented to the operator, step 380. The module 105 checks for completion of the route, step 390, and if complete, ends the cycle. If the route is not complete, then module 105 checks for a fueling station location, step 395. If the vehicle is not at a fueling station, module 105 accesses the fuel sensor and renews the assessment process. As described above, the assessment of fuel consumption needed along points in the route can be realized by traversing the engine map to find the appropriate engine speed and torque combination to satisfy the power demand and fuel consumption. If the vehicle is at a fueling station, taking advantage of the improved accuracy available in the second fuel assessment, module 105 can recommend the quantity of fuel to add in accordance with the freight load optimization determination during the offline initialization. The quantity of fuel to add is communicated to display 107 to inform the operator, step 398. After fueling, the system restarts and begins assessment determinations for the next section of route. This process continues until the vehicle reaches the end of the route. Therefore, the online assessment includes a series of assessments or determinations in which fuel quantity is determined and adjusted throughout the trip along the route, as well as refinement of the location of fueling stops. In this manner operators will know the optimum fueling stop locations and amount of fuel to add that balances vehicle weight, fuel economy, and freight efficiency.

Exemplary embodiments provide a system adapted for vehicle fuel quantity management. The system includes an operator input module containing data indicative of at least one operator input, the at least one operator input including at least one of fuel cost, trip time, route beginning and ending points to define a route, maximum vehicle speed, number of fuel stops, and desired fuel buffer. The system further includes a vehicle parameter module containing data indicative of at least one predetermined vehicle parameter, the at least one predetermined vehicle parameter including at least one of vehicle mass, vehicle drag, vehicle rolling resistance, tire circumference, front area of vehicle, powertrain torque loss, vehicle tank capacity, and engine friction. The system also includes a road terrain element module containing data indicative of at least one road terrain element, the at least one road terrain element including at least one of speed limit changes, off ramp locations, fueling locations, road grade, air density, position, elevation, and traffic congestion. The system additionally includes a vehicle operating condition module containing data indicative of at least current vehicle speed. And the system includes a vehicle fuel quantity management module adapted to perform a first fuel assessment to determine a preliminary route fuel quantity based on route grade and speed profile vectors, the predetermined vehicle parameter data, the road terrain data, and the operator input data; determine a first fuel quantity to optimize freight weight based on the first fuel assessment and operator input data; and perform a second fuel assessment to determine at least one recommended fueling stop location and at least one recommended fuel amount.

Exemplary embodiments provide a system and method for vehicle fuel quantity management to be implemented in computer programmable software and stored in computer readable media. Such an embodiment would comprise a computer readable storage medium encoded with computer executable instructions, which, when executed by a processor, perform the method for vehicle fuel quantity management as disclosed above. Also, many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions (software), such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

While various embodiments in accordance with the present disclosure have been shown and described, it is understood that the disclosure is not limited thereto. Further, the present disclosure may be changed, modified and further applied by those skilled in the art. Therefore, this disclosure is not limited to the detail shown and described previously, but also includes all such changes and modifications.

We claim:

1. A method for vehicle fuel quantity management, comprising:
   providing one or more processors;
   accessing first operator input data indicative of at least one first operator input, said at least one first operator input including at least one of fuel cost, trip time, route beginning and ending points to define a route, and maximum vehicle speed;
   accessing predetermined vehicle parameter data indicative of at least one predetermined vehicle parameter, said at least one predetermined vehicle parameter including at least one of vehicle mass, vehicle drag, vehicle rolling resistance, tire circumference, front area of vehicle, powertrain torque loss, vehicle tank capacity, and engine friction;

accessing road terrain data indicative of at least one road terrain element, said at least one road terrain element including at least one of speed limit changes, off ramp locations, fueling locations, road grade, air density, position, elevation, and traffic congestion;

performing a first fuel assessment by the one or more processors to determine a preliminary route fuel quantity based on said predetermined vehicle parameter data, said road terrain data, and said first operator input data;

determining a first fuel quantity to optimize freight weight based on said first fuel assessment;

accessing current vehicle operating condition data and current road terrain data indicative of at least current vehicle speed, current road grade, and current fueling locations;

performing a second fuel assessment by the one or more processors to determine at least one recommended fueling stop location and at least one recommended fuel amount; and generating electronic recommendation signals corresponding to said determined at least one recommended fueling stop location and at least one recommended fuel amount and communicating said recommendation signals to a receiver.

2. The method of claim 1, further comprising determining route grade and speed profile vectors for the defined route based on said first operator input data, said predetermined vehicle parameter data, and said road terrain data.

3. The method of claim 1, further comprising accessing second operator input data indicative of at least one second operator input, said at least one second operator input including at least one of a number of fuel stops and a desired fuel buffer, wherein determining said first fuel quantity is based on said second operator input data.

4. The method of claim 3, further comprising determining an additional fuel quantity based on said operator fuel buffer and sensor and route uncertainties, said additional fuel quantity being incorporated into the at least one recommended fuel amount.

5. The method of claim 1, wherein said receiver comprises a display configured to indicate the at least one recommended fueling stop location and at least one recommended fuel amount to a vehicle operator and indicate a measure of freight efficiency improvement and sacrificed time.

6. The method of claim 5, wherein said display comprises a touch-screen interface.

7. The method of claim 5, wherein said display is further configured to indicate at least one of quantity of fuel remaining until empty, distance to drive before empty, and time to drive until empty.

8. The method of claim 1, wherein said determining first fuel quantity includes determining freight efficiency improvement and determining sacrificed time.

9. The method of claim 8, further comprising generating electronic signals corresponding to said freight efficiency improvement and sacrificed time and communicating said signals to a display.

10. The method of claim 1, wherein said first fuel quantity and said at least one recommended fuel amount are based on an evaluation of engine speed and torque values yielding said engine friction for a given vehicle power, said power being based on route grade and speed profile vectors for the defined route, said route grade and speed vectors being based on said first operator input data, said predetermined vehicle parameter data, and said road terrain data.

11. The method of claim 10, wherein a plurality of said engine speed and torque values can collectively form an engine friction map, said map being employed to establish an engine fueling table.

12. A system adapted for vehicle fuel quantity management, comprising:

one or more processors, an operator input module containing data indicative of at least one operator input, said at least one operator input including at least one of fuel cost, trip time, route beginning and ending points to define a route, and maximum vehicle speed;

a vehicle parameter module containing data indicative of at least one predetermined vehicle parameter, said at least one predetermined vehicle parameter including at least one of vehicle mass, vehicle drag, vehicle rolling resistance, tire circumference, front area of vehicle, powertrain torque loss, vehicle tank capacity, and engine friction;

a road terrain element module containing data indicative of at least one road terrain element, said at least one road terrain element including at least one of speed limit changes, off ramp locations, fueling locations, road grade, air density, position, elevation, and traffic congestion;

a vehicle operating condition module containing data indicative of at least current vehicle speed; and a vehicle fuel quantity management module configured to:

perform a first fuel assessment by the one or more processors to determine a preliminary route fuel quantity based on said predetermined vehicle parameter data, said road terrain data, and said operator input data;

determine a first fuel quantity to optimize freight weight based on said first fuel assessment and operator input data; and perform a second fuel assessment by the one or more processors to determine at least one recommended fueling stop location and at least one recommended fuel amount.

13. The system of claim 12, wherein said vehicle fuel quantity module further determines route grade and speed profile vectors for the defined route based on said operator input data, said predetermined vehicle parameter data, and said road terrain element data.

14. The system of claim 13, wherein said receiver comprises a display configured to indicate the at least one recommended fueling stop location and at least one recommended fuel amount to a vehicle operator and indicate a measure of freight efficiency improvement and sacrificed time.

15. The system of claim 12, wherein said operator input module further contains data indicative of at least one of a number of fuel stops and a desired fuel buffer.

16. The system of claim 12, wherein said vehicle fuel quantity management module is configured to generate electronic recommendation signals corresponding to said determined at least one recommended fueling stop location and at least one recommended fuel amount and communicate said recommendation signals to a display configured to indicate the at least one recommended fueling stop location and at least one recommended fuel amount to a vehicle operator.

17. The system of claim 12, wherein said vehicle fuel quantity management module is further configured to determine freight efficiency improvement and sacrificed time and generate electronic signals corresponding to said freight efficiency improvement and sacrificed time and communicate said signals to a display.

18. The system of claim 17, wherein said display is further configured to indicate at least one of quantity of fuel remaining until empty, distance to drive before empty, and time to drive until empty.

19. The system of claim 12, wherein said first fuel quantity and said at least one recommended fuel amount are based on an evaluation of engine speed and torque values yielding said engine friction for a given vehicle power, said power being based on the route grade and speed profile vectors, at least one vehicle parameter, and at least one road terrain element.

20. The system of claim 19, wherein a plurality of said engine speed and torque values can collectively form an engine friction map, said map being employed to establish an engine fueling table.

21. The system of claim 12, wherein said vehicle fuel quantity management module is further configured to determine an additional fuel quantity based on said operator fuel buffer and sensor and route uncertainties, said additional fuel quantity being incorporated into the at least one recommended fuel amount.

22. A computer program product comprising a non-transitory computer useable medium having stored thereon computer-readable program code for vehicle fuel quantity management, the computer-readable program code comprising:

- computer-readable program code for accessing data indicative of at least one first operator input, said at least one first operator input including at least one of fuel cost, trip time, route beginning and ending points to define a route, and maximum vehicle speed;
- computer-readable program code for accessing data indicative of at least one predetermined vehicle parameter, said at least one predetermined vehicle parameter including at least one of vehicle mass, vehicle drag, vehicle rolling resistance, tire circumference, front area of vehicle, powertrain torque loss, vehicle tank capacity, and engine friction;
- computer-readable program code for accessing data indicative of at least one road terrain element, said at least one road terrain element including at least one of speed limit changes, off ramp locations, fueling locations, road grade, air density, position, elevation, and traffic congestion;
- computer-readable program code for determining route grade and speed profile vectors for the defined route based on said first operator input data, predetermined vehicle parameter data, and said road terrain data;
- computer-readable code for performing a first fuel assessment to determine a preliminary route fuel quantity based on the defined route grade and speed profile vectors, said predetermined vehicle parameter data, road terrain data, and said first operator input data;
- computer-readable program code for accessing data indicative of at least one second operator input including at least one of a number of fuel stops and desired fuel buffer;
- computer-readable program code for determining a first fuel quantity to optimize freight weight based on said first fuel assessment and said second operator input data;
- computer-readable program code for accessing current vehicle operating condition data and current road terrain data indicative of at least current vehicle speed, current road grade, and current fueling locations;
- computer-readable program code for performing a second fuel assessment to determine at least one recommended fueling stop location and at least one recommended fuel amount; and
- computer-readable program code for communicating said optimized vehicle speed and communicating said at least one recommended fueling stop location and at least one recommended fuel amount to a display.

23. The computer program product of claim 22, further comprising computer-readable program code for disabling the vehicle fuel quantity management program code in response to an operator-initiated event.

* * * * *